(No Model.) 2 Sheets—Sheet 1.
E. BENNETT.
COMBINED HOISTING AND TELESCOPING APPARATUS FOR THRESHING MACHINE CHUTES.
No. 598,071. Patented Feb. 1, 1898.
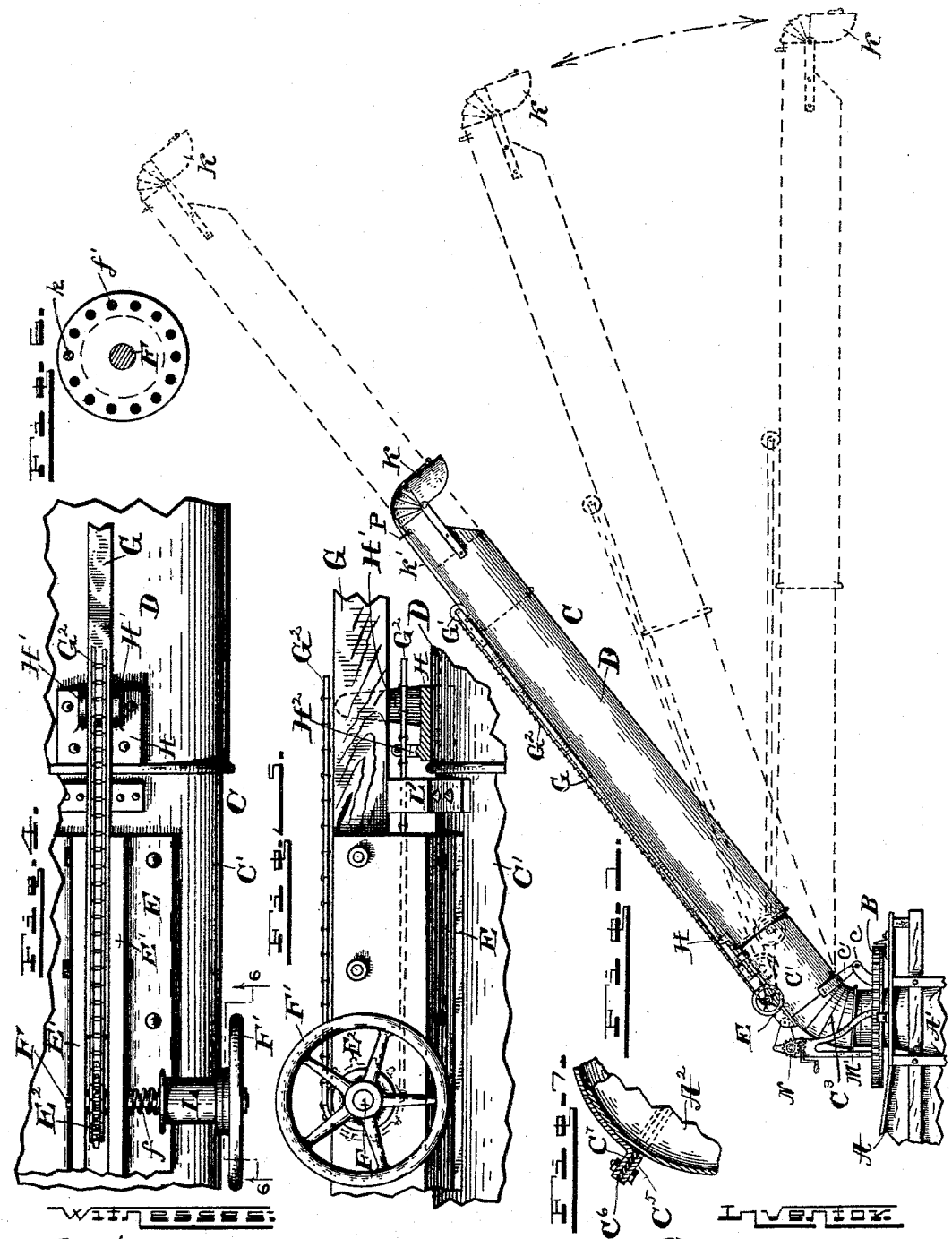
WITNESSES:
F. W. Woerner.
L. A. Minturn.
INVENTOR
Elwood Bennett
By Joseph A. Minturn
ATTORNEY.

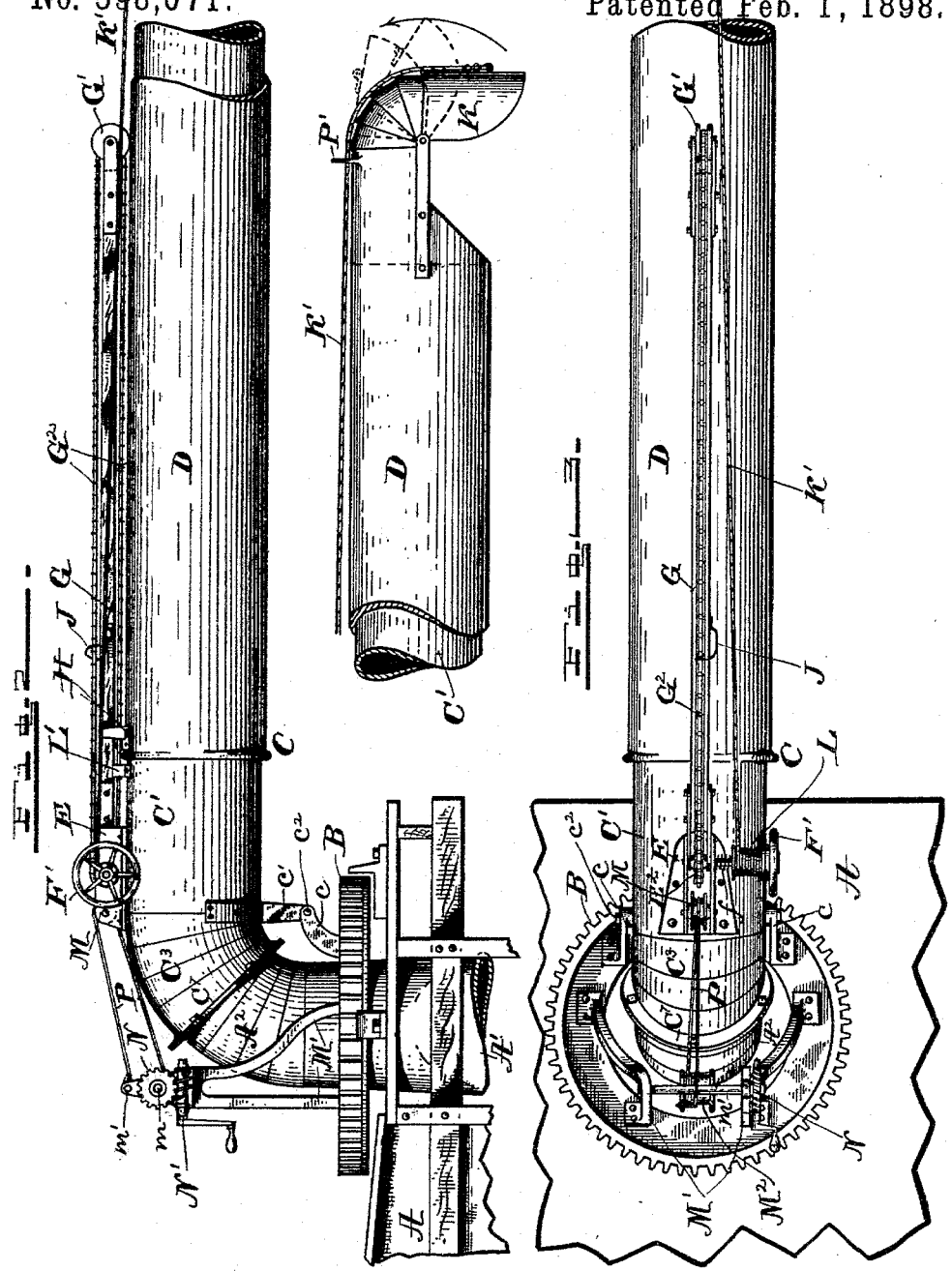

UNITED STATES PATENT OFFICE.

ELWOOD BENNETT, OF KOKOMO, INDIANA.

COMBINED HOISTING AND TELESCOPING APPARATUS FOR THRESHING-MACHINE CHUTES.

SPECIFICATION forming part of Letters Patent No. 598,071, dated February 1, 1898.

Application filed February 10, 1896. Serial No. 578,794. (No model.)

*To all whom it may concern:*

Be it known that I, ELWOOD BENNETT, a citizen of the United States, residing at Kokomo, in the county of Howard and State of Indiana, have invented certain new and useful Improvements in a Combined Hoisting and Telescoping Apparatus for Threshing-Machine Chutes; and I do hereby declare the following to be a full, clear, and exact description of the invention, such as will enable others skilled in the art to which it appertains to make and use the same.

The objects of this invention are, first, to provide means for raising and lowering the chute of a pneumatic straw-stacking machine and to provide mechanism for this purpose that will not project higher than the chute when the latter is in its lowest horizontal position, the purpose being to dispense with the derricks heretofore used, which, projecting several feet above the chute, offered an impediment to the passage of the machine through the doorways into barns, as is often desired; second, to provide means for telescoping the chute whereby for a given length of tubes the chute can be drawn out longer and drawn back into shorter length than has been possible heretofore; third, to provide mechanism for telescoping the tubes that will be compact and light in weight, simple in construction, and that will give better support to the outer tube than devices used heretofore for that purpose; fourth, to provide mechanism for adjusting the position of the hood at the end of the chute from the same hand-wheel that controls the extension of the chute; fifth, to provide a packing for the elbow of the chute that will prevent the escape of air between the sliding sections of same.

I accomplish the objects of the invention by the mechanism illustrated in the accompanying drawings, in which—

Figure 1 is a view in side elevation of a telescoping chute provided with my improvements, the chute in this view being shown in the solid lines in its elevated position with the outside tube drawn in or closed. The extension of the outer tube and two lower adjustments of the entire chute are indicated by dotted lines. Fig. 2 is a view in side elevation of my improved mechanism, showing the chute in its horizontal working position. In order to show the outer end of the chute on the same scale as the inner portion, the chute has been represented in this figure as broken and the outer end placed underneath the main figure. The dotted lines show the different adjustments of the hood at the end of the chute. Fig. 3 is a detail in plan view of as much of the chute and attachments as is shown in the upper detail of Fig. 2. Fig. 4 is a detail in plan view, and Fig. 5 in side elevation, of the mechanism for telescoping the chute and for adjusting the hood. Fig. 6 is a section on the line 6 6 through the hub of the hand-wheel shown in Fig. 4. Fig. 7 is a detail in vertical section showing the packing whereby the joint in the elbow of the chute is rendered air-tight.

Similar letters of reference indicate like parts throughout the several views of the drawings.

A represents a portion of the threshing-machine, A' the discharge-pipe for the straw and chaff issuing from the fan, and B the turn-table connected with the pipe A'. All of these parts will be of the usual construction and the turn-table B will have automatic means of any suitable and usual construction for shifting the chute laterally, in order to distribute the straw uniformly over a semicircular stack.

The upper end of the pipe A' terminates with the curved neck A².

C' represents the inner tube of the chute C, and is provided with the curved neck C³, into which the curved neck A² is projected, thereby providing a telescoping elbow. The pipe A' and tube C' are hinged together by means of the standards *c* (which are bolted to the platform of the turn-table and project up and back to the center from which the curve of the elbow was made) and the bracket *c'*, which bracket is riveted to the under side of the section C' and projects down into engagement with a hinge-rod *c²*, connecting the standards and bracket.

Jointed elbows have been used in the construction of pneumatic stackers before my invention, but so far as I am aware the joints have not been packed. The result has been a lessening of the efficiency of the stacker, because of the waste of energy due to the escape of the air through the open joint and also the discharge of dust and chaff through said opening onto the machine to the great inconvenience of the operatives and damage to the mechanism of the thresher. To prevent this, I provide an outside annular flange on the end of the curved neck $C^3$. This flange is designated by the letter $C^7$, and to said flange a ring $C^5$ is bolted, as shown in cross-section in Fig. 7. A flexible packing $C^6$, preferably rubber, will be inserted between the flange $C^7$ and ring $C^5$ and held therein by means of the bolts. The packing will bear against the outer surface of the curved neck $A^2$, so as to make an air-tight joint.

D represents the outer tube of the telescoping chute and slides in and out on the tube C', so as to lengthen or shorten said chute, as the requirements demand.

E is a cast-iron saddle which is riveted or bolted to the top of the tube C', adjacent to the neck $C^3$. It is provided with the two upwardly-projected flanges E', parallel with each other and running longitudinally of the pipe C'.

$E^2$ is a sprocket-wheel between the flanges E' on the shaft F.

The shaft F is projected through suitable openings in the flanges E', and the sprocket-wheel $E^2$ is secured to the shaft, so as to revolve when the shaft is turned.

F' is a hand-wheel by means of which the shaft and its attached wheel are rotated.

G is a bar, preferably of wood, one end of which is bolted between the flanges E', as clearly shown in Figs. 4 and 5, and the outer end of which terminates near the outer end of the tube C', the bar being parallel with the said tube, but not quite as long as the tube. A small flange-pulley G' is secured to the outer end of the bar. The bar is held two or three inches above the tube C' and also above the outer tube D to leave room for the free action of a link belt $G^2$. The belt $G^2$ passes around the wheels $E^2$ and G' and will be actuated by turning the hand-wheel F'.

H is a block which is riveted or bolted to the tube D, close to the inner end of said tube. It is provided with the two ears H', which are a distance apart just equal to the width of the wooden bar G, and are placed one on each side of the said bar, whereby a rotary movement of the tube D around the tube C' will be prevented. A lug $H^2$, integral with the block and projecting up through the opening in one of the links of the belt $G^2$, will be provided. The lug will have a hole in its upper end. After the lug is projected through one of the links of the belt a pin inserted through the opening in the lug, above the link, will prevent the withdrawal of the lug from the link and provide means whereby the outer tube will be moved in and out on its inner tube uniformly with the movement of the chain. By turning the hand-wheel F' the chute will be lengthened or shortened, according to the direction in which the wheel is turned.

In order to more fully control the delivery of straw from the mouth of the chute, it is customary to provide an adjustable hood made in jointed sections and held together in such a manner over the mouth of the chute that the straw, coming in contact with the surface formed by the sections, will be deflected from the initial course given it in its passage through the chute. K represents this hood in my construction, and K' is a cord which is fastened at one end to the outer member or section of the hood and is passed thence back to the drum L on the shaft F. This drum is mounted loosely on the shaft F, but is pressed over firmly against the hub of the hand-wheel F' by means of the spiral spring $f$. The inside face of the hub of the wheel F' has a concentric series of holes $f'$, and the adjacent face of the drum is provided with the pin $k$, which fits into the said holes, whereby when the hand-wheel is turned the drum will be correspondingly rotated and the cord K', which is fastened to the drum, will be wound on or off of said drum.

When it is desired to change the existing adjustment or inclination of the hood, the drum is pressed away from the hub of the hand-wheel by compressing the spring $f$ and the drum is turned in the direction to give the required adjustment, and the pin is then inserted into the proper hole in the hub of the hand-wheel, where it will be held by the pressure of the spring when the drum is released.

J is a hook which is caught through one of the links of the belt and holds the chain from moving.

L' is a stop riveted to the inner tube and forming a rest or support for the bar G. It also acts as a stop to check the inward movement of the tube D in shortening up the chute.

I will now describe the mechanism by which the outer end of the chute will be raised and lowered. Instead of the high derrick to strike on the tops of door-frames leading into barns and sheds I provide a compact hoisting device that will not offer an obstruction by extending above the top of the tube.

M is a sheave mounted between the flanges E' at the inner end of same.

M' are standards bolted to the platform of the turn-table B. They form the supports for the horizontal shaft $m$ and the shaft $m'$, parallel with and superimposed above the shaft $m$. The shaft $m$ has the drum $M^2$ mounted thereon and is provided with the toothed wheel N, which has engagement with the thread of the worm N'. A crank on the worm enables the latter to be turned, whereby the shaft $m$ and its drum will be rotated.

P is a cable, one end of which is made fast to the shaft $m'$. From thence the cable is passed over the sheave M and the other end is made fast to the drum $M^2$. It will be noticed that the drum $M^2$ is below the horizontal axial plane of the sheave. By using the worm-gear and by doubling the cable around the sheave a very powerful hoisting mechanism is secured.

P' is a guide to hold the cord leading to the hood from dropping off to one side of the pipe. It will be noticed that the sprocket-wheel G' at the outer end of the bar G is provided with flanges, which bear upon the tube D and assist in guiding and controlling the movement of the tube.

I am aware that telescoping tubes have been used in the construction of pneumatic stackers; but the construction has been such that not more than one-third of the length of the tubes could be used for extension purposes, but with my peculiar construction and arrangements of parts I can slide my outer tube almost the entire length of the inner tube, whereby I am able to fold the chute up into a shorter space, when desired, and draw it out into a longer pipe when extended.

Having thus fully described my invention, what I claim as new, and wish to secure by Letters Patent of the United States, is—

1. The combination, in a pneumatic stacker, of the chute composed of a non-slidable section and a slidable section, the non-slidable section supporting the slidable section, a wheel supported near the outer end of the non-slidable section by means of a rigid bar, a rigid bar placed above the sections in the vertical plane through the axis of the sections, parallel with and adjacent to but not contacting with the slidable section, said bar being supported at its inner end, a wheel or drum mounted near the inner end of the non-slidable section, stops secured to the slidable section to regulate the telescoping movement of the parts of the chute and extending up so as to contact the said bar so as to keep the slidable section from rotating, a belt fastened to the inner end of the slidable section and passing around both of the wheels, and a crank for rotating the inner wheel, all substantially as and for the purposes specified.

2. The combination, with the inner and the outer telescoping tubes of a pneumatic stacker, of a rigid bar secured to or near the inner end of the inner tube and extending in an outward direction parallel with the tubes but not contacting therewith, sprocket-wheels mounted at each end of the bar, a link belt passing over the wheels at both of the ends of the bar and along the upper and lower sides of the bar, means for rotating the inner sprocket-wheel and a block secured to the inner end of the outer tube, said block having a pair of ears between which the bar is placed and forming a guide for the said bar and having a lug to be projected through the opening in one of the links of the chain belt and means for fastening the chain to said lug whereby the outer tube will move when the chain is moved, substantially as described and for the purposes set forth.

3. In a hoisting apparatus for pneumatic stackers, the combination with a tubular chute hinged so as to have vertical adjustment and supported from the platform of a turn-table, and a block riveted to the top of said chute near the inner end of its straight portion, said block having two parallel flanges, of a sheave mounted between the flanges of the block, a pair of standards secured to the platform of the turn-table, a drum mounted on a shaft which is supported by said standards, a worm-gear to actuate the drum, a second shaft secured to the standards but at a point above the drum and a cable passing around the sheave and secured, the one of its ends to the drum and the other of its ends to the shaft above the drum, all substantially as described and specified.

In testimony whereof I affix my signature in presence of two witnesses.

ELWOOD BENNETT.

Witnesses:
JOSEPH A. MINTURN,
F. W. WOERNER.